United States Patent
Eichenberger et al.

(10) Patent No.: US 8,037,464 B2
(45) Date of Patent: Oct. 11, 2011

(54) GENERATING OPTIMIZED SIMD CODE IN THE PRESENCE OF DATA DEPENDENCES

(75) Inventors: Alexandre E. Eichenberger, Chappaqua, NY (US); Amy K. Wang, North York (CA); Peng Wu, Mt. Kisco, NY (US); Peng Zhao, North York (CA)

(73) Assignee: International Business Machines Corporation, Armonk, NY (US)

( * ) Notice: Subject to any disclaimer, the term of this patent is extended or adjusted under 35 U.S.C. 154(b) by 1415 days.

(21) Appl. No.: 11/535,181

(22) Filed: Sep. 26, 2006

(65) Prior Publication Data

US 2008/0127059 A1    May 29, 2008

(51) Int. Cl.
*G06F 9/45* (2006.01)
(52) U.S. Cl. ...................................................... 717/151
(58) Field of Classification Search .................... 717/151
See application file for complete search history.

(56) References Cited

U.S. PATENT DOCUMENTS

| | | | | |
|---|---|---|---|---|
| 7,313,788 | B2 * | 12/2007 | Ben-David et al. | 717/150 |
| 7,475,392 | B2 * | 1/2009 | Eichenberger et al. | 717/150 |
| 7,509,634 | B2 * | 3/2009 | Kyo | 717/161 |
| 2004/0064810 | A1 * | 4/2004 | Wang et al. | 717/159 |
| 2004/0098709 | A1 * | 5/2004 | Kyo | 717/140 |
| 2005/0197977 | A1 * | 9/2005 | Buck et al. | 706/12 |
| 2005/0273769 | A1 | 12/2005 | Eichenberger et al. | |
| 2005/0273770 | A1 | 12/2005 | Eichenberger et al. | |
| 2005/0283769 | A1 | 12/2005 | Eichenberger et al. | |
| 2005/0283773 | A1 | 12/2005 | Eichenberger et al. | |
| 2005/0283774 | A1 | 12/2005 | Eichenberger et al. | |
| 2005/0283775 | A1 | 12/2005 | Eichenberger et al. | |
| 2007/0174825 | A1 * | 7/2007 | Eichenberger et al. | 717/140 |
| 2008/0307402 | A1 * | 12/2008 | Eichenberger et al. | 717/151 |

* cited by examiner

*Primary Examiner* — John Chavis
(74) *Attorney, Agent, or Firm* — Michael LeStrange; Roberts Mlotkowski Safran & Cole P.C.

(57) ABSTRACT

A method for generating code, including identifying at least one portion of source code that is simdizable and has a dependence, analyzing the dependence for characteristics, based upon the characteristics, selecting a transformation from a predefined group of transformations, applying the transformation to the at least one portion to generate SIMD code for the at least one portion.

35 Claims, 19 Drawing Sheets

SIMD operation of a[i+2] = b[i+1] + c[i+3]

```
1.  for(i=0; i<N; i++) c[i+Oc] = ... d[i+Od] ...;
```

FIG. 6A

```
1.  // prologue for first iterations
2.  Let Ac be Alignment(c[Oc])
3.  Let Ax be Alignment(d[Od])
4.  prevC = shift-left(c[Oc+0..B-1], Ac);
5.  for(i=B; i<N'; i+=B) {
6.          currC = .... shift-left(d[i+Od+0..B-1], Ax); // original offset
7.          c[i+Oc-Ac+0..B-1] = shift-pair-right(prevC, currC, Ac);
8.          prevC = currC;
9.  }
10. // epilogue for last iterations
```

FIG. 6B

```
1.  // prologue for first iterations
2.  Let Ac be Alignment(c[Oc])
3.  Let Ax be Alignment(d[Od-Ac])
4.  for(i=B; i<N'; i+=B) {
5.          currC = .... shift-left(d[i+Od-Ac+0..B-1], Ac); // shifted by Ac
6.          c[i+Oc-Ac+0..B-1] = currC;
7.  }
8.  // epilogue for last iterations
```

FIG. 6C

```
1.  Let Ax be Alignment(&a[Oa-d-Ab]);
2.  for(i=B; i<N'; i++) {
3.      a[i+Oa-Aa+0..B-1] = ...;
4.      b[i+Ob-Ab+0..B-1] = ... shift-left(a[i+Oa-d-Ab+0..B-1], Ax);
5.  }

// Forward flow dependence with STS, d>=Aa-Ab
```

FIG. 10

```
1.  Let Ay be Alignment(&a[i+Oa-d]);
2.  prevA = shift-left(a[i+Oa], Aa);
3.  prevB = shift-left(b[i+Ob], Ab);
4.  for(i=B; i<N'; i++) {
5.      currA = computation for 'a[i+Oa+0..B-1]'
6.      a[i+Oa-Aa+0..B-1] = shift-pair-right(prevA, currA, Aa);
7.      currB = ... shift-left(a[i+Oa-d+0..B-1], Ay) ...
8.      b[i+Ob-Ab+0..B-1] = shift-pair-right(prevB, currB, Ab);
9.      prevA = currA;
10.     prevB = currB;
11. }

// Forward flow dependence with STZ, d>=Aa.
```

FIG. 11

```
1.   prevA = shift-left(a[i+Oa], Aa);
2.   prevB = shift-left(b[i+Ob], Ab);
3.   for(i=B; i<N'; i++) {
4.       currA = computation for 'a[i+Oa+0..B-1]'
5.       a[i+Oa-Aa+0..B-1] = shift-pair-right(prevA, currA, Aa);
6.       currB = ... shift-pair-left(prevA, currA, B-d) ...
7.       b[i+Ob-Ab+0..B-1] = shift-pair-right(prevB, currB, Ab);
8.       prevA = currA;
9.       prevB = currB;
10. }

// Forward flow dependence with STZ, d<=B.
```

FIG. 12

```
1.   Let Ax be Alignment(&a[Oa+d-Ab]);
2.   for(i=B; i<N'; i++) {
3.       b[i+Ob-Ab+0..B-1] = ... shift-left(a[i+Oa+d-Ab+0..B-1], Ax);
4.       a[i+Oa-Aa+0..B-1] = ...;
5.   }

// Forward anti dependence with STS, d>Ab-Aa-1.
```

FIG. 13

```
1.   Let Ax be Alignment(&a[Oa+d-Ab]);
2.   for(i=B; i<N'; i++) {
3.       nextUseA = a[i+Oa+d-Ab-Ax+B+0..B-1];
4.       b[i+Ob-Ab+0..B-1] = ... shift-pair-left(currUseA, nextUseA, Ax);
5.       a[i+Oa-Aa+0..B-1] = ...;
6.       currUseA = nextUseA;
7.   }

// Forward anti dependence with STS, d>=0.
```

FIG. 14

```
1.   Let Ay be Alignment(&a[i+Oa+d]);
2.   prevA = shift-left(a[i+Oa], Aa);
3.   prevB = shift-left(b[i+Ob], Ab);
4.   for(i=B; i<N'; i++) {
5.       currB = ... shift-left(a[i+Oa+d+0..B-1], Ay) ...
6.       b[i+Ob-Ab+0..B-1] = shift-pair-right(prevB, currB, Ab);
7.       currA = computation for 'a[i+Oa+0..B-1]'
8.       a[i+Oa-Aa+0..B-1] = shift-pair-right(prevA, currA, Aa);
9.       prevA = currA;
10.      prevB = currB;
11.  }

// Forward anti dependence with STZ, d>=0.
```

FIG. 15

```
1.  Let Ax be Alignment(&a[Oa+d-Ab]);
2.  for(i=B; i<N'; i++) {
3.     a[i+Oa-Aa+0..B-1] = ...;
4.     b[i+Ob-Ab+0..B-1] = ... shift-left(a[i+Oa+d-Ab+0..B-1], Ax);
5.  }

// Backward anti dependence with STS, d > B+Ab-Aa-1.
```

FIG. 16

```
1.  Ax = Align(&a[i+Oa+d-Ab]);
2.  for(i=B; i<N'; i++) {
3.     currUseA = a[i+Oa+d-Ab-Ax+0..B-1];
4.     nextUseA = a[i+Oa+d-Ab-Ax+B+0..B-1];
5.     a[i+Oa-Aa+0..B-1] = ...;
6.     b[i+Ob-Ab+0..B-1] = ... shift-pair-left(currUseA, nextUseA, Ax);
7.  }

// Backward anti dependence with STS, d>Ab-Aa-1.
```

FIG. 17

```
1.  Let Ax be Alignment(&a[Oa+d-Ab]);
2.  for(i=B; i<N'; i++) {
3.      nextUseA = a[i+Oa+d-Ab-Ax+B+0..B-1];
4.      a[i+Oa-Aa+0..B-1] = ...;
5.      b[i+Ob-Ab+0..B-1] = ... shift-pair-left(currUseA, nextUseA, Ax);
6.      currUseA = nextUseA;
7.  }

// Backward anti dependence with STS, d>=0.
```

FIG. 18

```
1.  Let Ay be Alignment(&a[Oa+d]);
2.  prevA = shift-left(a[i+Oa], Aa);
3.  prevB = shift-left(b[i+Ob], Ab);
4.  for(i=B; i<N'; i++) {
5.      currA = computation for 'a[i+Oa+0..B-1]'
6.      a[i+Oa-Aa+0..B-1] = shift-pair-right(prevA, currA, Aa);
7.      currB = ... shift-left(a[i+Oa+d+0..B-1], Ay) ...
8.      b[i+Ob-Ab+0..B-1] = shift-pair-right(prevB, currB, Ab);
9.      prevA = currA;
10.     prevB = currB;
11. }

// Backward anti dependence with STZ, d >B - Aa-1.
```

FIG. 19

```
1.   Ay = Align(&a[i+Oa+d]);
2.   prevA = shift-left(a[i+Oa], Aa);
3.   prevB = shift-left(b[i+Ob], Ab);
4.   for(i=B; i<N'; i++) {
5.      currA = computation for 'a[i+Oa+0..B-1]'
6.      currB = ... shift-left(a[i+Oa+d+0..B-1], Ay) ...
7.      a[i+Oa-Aa+0..B-1] = shift-pair-right(prevA, currA, Aa);
8.      b[i+Ob-Ab+0..B-1] = shift-pair-right(prevB, currB, Ab);
9.      prevA = currA;
10.     prevB = currB;
11. }

// Backward anti dependence with STZ, d > 0.
```

FIG. 20

```
1.  Let Ax be Alignment(&a[Oa-d-Ab]);
2.  for(i=B; i<N'; i++) {
3.     b[i+Ob-Ab+0..B-1] = ... shift-left(a[i+Oa-d-Ab+0..B-1], Ax);
4.     a[i+Oa-Aa+0..B-1] = ...;
5.  }

// Backward flow dependence with STS, d > B+Aa-Ab.
```

FIG. 21

```
1.   Let Ay be Alignment(&a[Oa-d]);
2.   prevA = shift-left(a[i+Oa], Aa);
3.   prevB = shift-left(b[i+Ob, Ab]);
4.   for(i=B; i<N'; i++) {
5.        currB = ... shift-left(a[i+Oa-d+0..B-1], Ay) ...
6.        b[i+Ob-Ab+0..B-1] = shift-pair-right(prevB, currB, Ab);
7.        currA = computation for 'a[i+Oa+0..B-1]'
8.        a[i+Oa-Aa+0..B-1] = shift-pair-right(prevA, currA, Aa);
9.        prevA = currA;
10.       prevB = currB;
11.  }

// Backward flow dependence with STZ, d>=B+Aa.
```

FIG. 22

```
1.   prevA = shift-left(a[i+Oa], Aa);
2.   prevB = shift-left(b[i+Ob], Ab);
3.   for(i=B; i<N'; i++) {
4.        currB = ... shift-pair-left(prevA, currA, B-d) ...
5.        prevA = currA;
6.        b[i+Ob-Ab+0..B-1] = shift-pair-right(prevB, currB, Ab);
7.        currA = computation for 'a[i+Oa+0..B-1]'
8.        a[i+Oa-Aa+0..B-1] = shift-pair-right(prevA, currA, Aa);
9.        prevB = currB;
10.  }

// Forward flow dependence with STZ, B<=d<=2B.
```

FIG. 23

Code Scheme Classifications for Dependences Marked STS

| | flow | | anti | |
|---|---|---|---|---|
| forward (d>=0) | FIG. 10 | d>=Aa-Ab | FIG. 13 | d>Ab-Aa-1 |
| | | | FIG. 14 | d>=0 |
| backward (d>0) | FIG. 21 | d>B+Aa-Ab | FIG. 16 | d>B+Ab-Aa-1 |
| | | | FIG. 17 | d>Ab-Aa-1 |
| | | | FIG. 18 | d>0 |

FIG. 24A

Code Scheme Classifications for Dependences Marked STZ

| | flow | | anti | |
|---|---|---|---|---|
| forward (d>=0) | FIG. 11 | d>=Aa | FIG. 15 | d>=0 |
| | FIG. 12 | d<=B | | |
| backward (d>0) | FIG. 22 | d>=B+Aa | FIG. 19 | d>B-Aa-1 |
| | FIG. 23 | B<=d<=2B | FIG. 20 | d>0 |

FIG. 24B

GENERATING OPTIMIZED SIMD CODE IN THE PRESENCE OF DATA DEPENDENCES

FIELD OF THE INVENTION

The invention generally relates to a method, product and system for generating lower-level code from higher-level code, and, more particularly, to generating optimized SIMD code in the presence of data dependences.

BACKGROUND OF INVENTION

Computer processors function by processing data elements through various registers in accordance with instructions provided by a computer program. The processor executes instructions in the form of machine language, which are the low-level instructions relating to what data elements are processed through which registers. Most software, however, is written in higher-level programming code, such as C++, which has the advantages of being human readable and of embodying relatively complex processing operations using comparatively short, quickly-written commands. A compiler receives the high-level programming code, and based upon the programming of the compiler itself, generates the machine language that is readable by a processor.

Single Instruction Multiple Data (SIMD) operations are a known way of enhancing the performance (i.e., speed) of processors. Generally speaking, SIMD operations enhance performance by efficiently handling large quantities of data in parallel. Processors with SIMD capability are currently used in a wide range of machines, e.g., supercomputers, personal computers, game machines, etc. In order to realize the advantages of SIMD, these processors must be provided with machine language code having SIMD instructions. Accordingly, compilers have been developed that generate SIMD code from programs written in standard high-level languages.

The automatic generation of SIMD code, via a compiler with SIMD capability, is generally well understood for code that is parallel. Although the presence of non-aligned (e.g., not parallel) data elements adds considerable complexity to the generation of SIMD code, methods have been developed for handling such instances. For example, a compiler may track the alignment of each of the data involved in the computation and shift the alignment of the data in registers so as to generate valid SIMD code. However, the shifting may result in the generation of invalid code in the presence of dependences.

Data dependences are statements within the source code that depend on each other. For example, the definition of a new value in a first statement and the subsequent use of the defined value in a second statement creates a dependence between the statements. Dependences often exist in iterative loops where statements are commonly re-defined and re-used in each iteration. Dependences between statements enforce an ordering between the statements that, if violated, would result in an invalid code that generates erroneous results.

Dependences interact with automatic SIMD code generation (also referred to as "simdization") because the statements in a loop to be simdized must be re-ordered in order to satisfy the above-mentioned alignment constraints. Dependences between statements constrain the type of re-ordering that is legal, and, therefore, constrain simdization.

Because of these problems, compilers have been quite conservative when simdizing code in the presence of dependences. One rule typically followed is that when the dependence distance is large enough, then the compiler can simdize regardless of the alignment. More advanced compilers may use compile-time alignment information, when available, to further refine the minimum dependence distance required to simdize the code without violating the dependence.

These approaches, however, are unsatisfactory because empirical evidence in real world application indicates that a large fraction of dependences are very short. Compilers of the current technology simply do not simdize loops with such short dependences, and, in many instances, fail to provide the enhanced performance that SIMD is capable of achieving.

SUMMARY OF THE INVENTION

In a first aspect of the invention, a method comprises identifying at least one portion of source code that is simdizable and has a dependence. The method further includes analyzing the dependence for characteristics. The method further includes, based upon the characteristics, selecting a transformation from a predefined group of transformations and applying the transformation to the at least one portion to generate SIMD code for the at least one portion.

The method may further comprise inputting the source code to a compiler and outputting the generated SIMD code from the compiler. The characteristics may comprise a dependence distance. The characteristics may comprise an alignment value. The characteristics may comprise a dependence type selected from a group comprising: forward flow dependence, backward flow dependence, forward anti dependence, and backward anti dependence. The predefined group of transformations may comprise a first group of shift-to-zero transformations and a second group of shift-to-store transformations. The selecting may comprise selecting the transformation from the first group when a predefined condition is met and selecting the transformation from the second group when the predefined condition is not met.

Further according to the method, the selecting may comprise selecting a first transformation when the dependence distance and the alignment value are determinable via the analyzing, and selecting a second transformation when at least one of the dependence distance and alignment value are not determinable via the analyzing.

BRIEF DESCRIPTION OF THE DRAWINGS

FIG. 6A shows an example of code to be simdized;

FIGS. 6B and 6C show code schemes for simdizing;

FIGS. 10-23 show code schemes of transformations according to various aspects of the invention; and FIGS. 24A and 24B show a summary of code schemes applied based upon conditions.

DETAILED DESCRIPTION OF EMBODIMENTS OF THE INVENTION

The invention is directed to an optimization and SIMD code generation scheme that can tolerate dependences regardless of alignment. According to implementations of the invention, when the alignment of the dependent data is known at compile time, a compiler can precisely tailor the SIMD code generation scheme to the particular instance of alignment and dependence distance. When the alignment is not known at compile time, and, instead, is only known at run time, the compiler can apply a fail-safe SIMD code generation scheme where the code is simdized and no dependences are violated. In this manner, implementations of the invention are useful for providing the automatic generation of SIMD code in the presence of dependences. Accordingly, implementations of the invention are useful for providing the enhanced performance that SIMD is capable of achieving, even under circumstances where simdization was heretofore not feasible.

Figure 1:
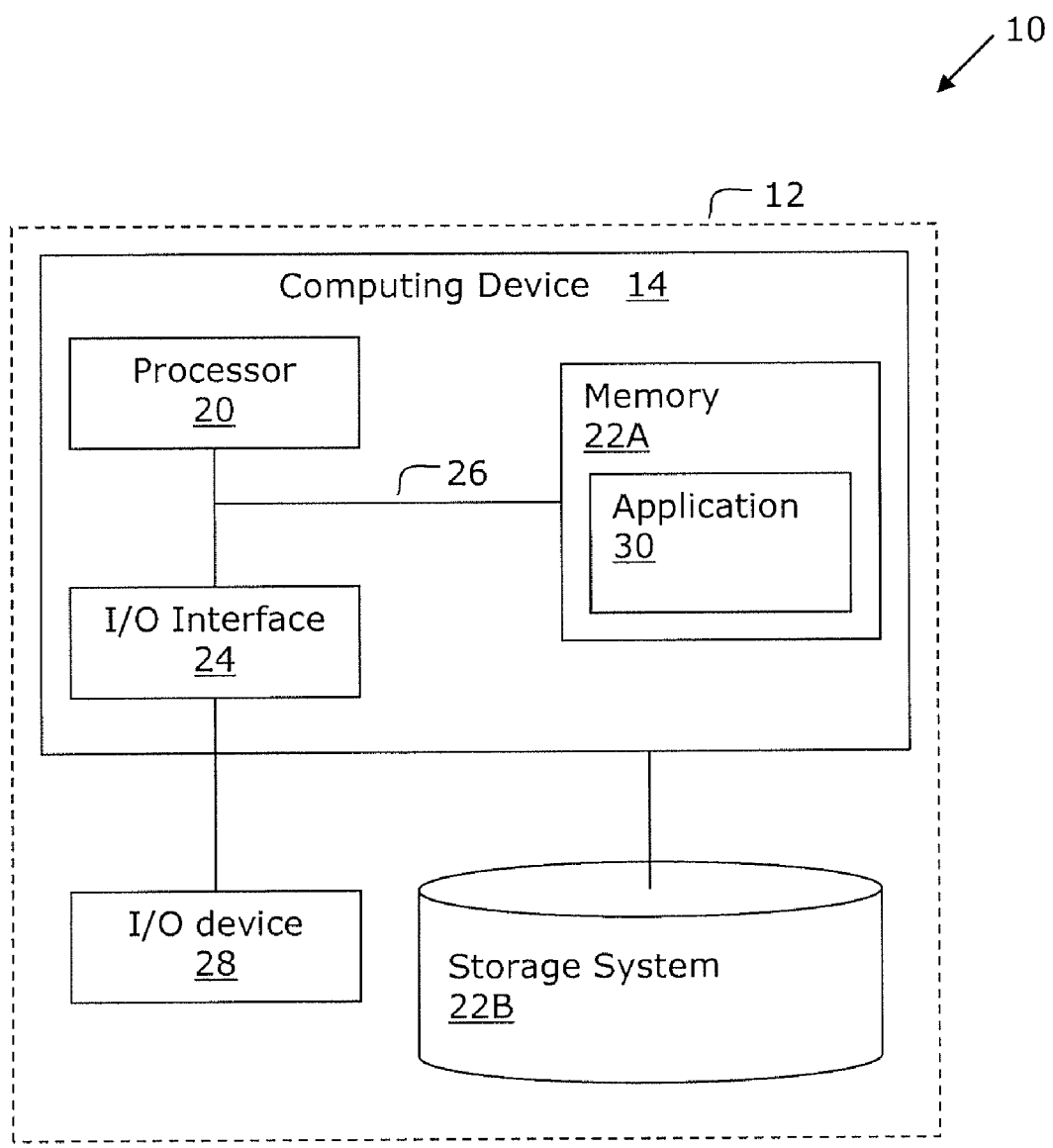
FIG. 1 shows an illustrative environment according to aspects of the invention.

FIG. 1 shows an illustrative environment 10 for managing the processes in accordance with embodiments of the invention. To this extent, the environment 10 includes a computer infrastructure 12 that can perform the processes described herein, such as, for example, generating optimized SIMD code. In particular, the computer infrastructure 12 is shown including a computing device 14 that comprises an application 30, which makes computing device 14 operable to perform at least some of the processes described herein. The computing device 14 is shown including a processor 20, a memory 22A, an input/output (I/O) interface 24, and a bus 26. Further, the computing device 14 is shown in communication with an external I/O device/resource 28 and a storage system 22B. As is known in the art, in general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

In any event, the computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in other embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in one embodiment, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. In either case, the communications link can comprise any combination of various types of wired and/or wireless links; comprise any combination of one or more types of networks (e.g., the Internet, a wide area network, a local area network, a virtual private network, etc.); and/or utilize any combination of various types of transmission techniques and protocols. As discussed herein, the application 30 enables computer infrastructure 12 to perform the processes described herein, such as, for example, generating optimized SIMD code. In embodiments, the application 30 comprises compiler software that is capable of performing the processes described herein.

Figure 2:
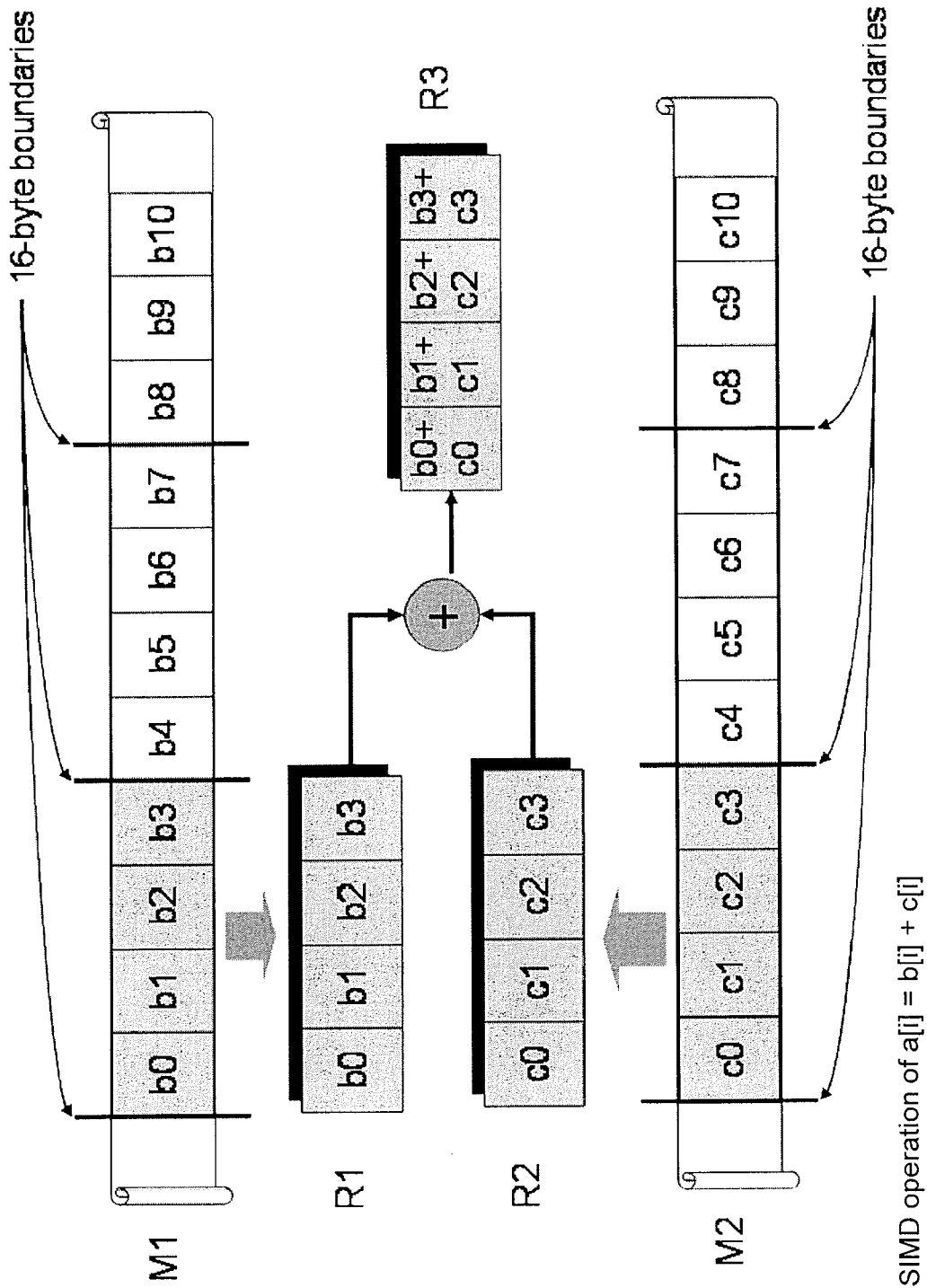
FIG. 2 depicts the processing of multiple data via SIMD operations.

FIG. 2 depicts the processing of multiple data via SIMD operations, as will be understood by one of ordinary skill in the art. Data elements are loaded in sixteen byte "chunks" from memory M1, M2 to registers R1, R2, and subsequently processed (in this example, they are added according to the statement a[i]=b[i]+c[i]). Although the invention is described in terms of using sixteen byte chunks, sizes other than sixteen bytes may also be used in accordance with implementations of the invention. The result in register R3 is stored back into memory. SIMD operations, such as that depicted in FIG. 2, are capable of providing enhanced computing performance because performing operations simultaneously on chunks of data is generally faster than performing the same operation on each data element individually.

Figure 3:
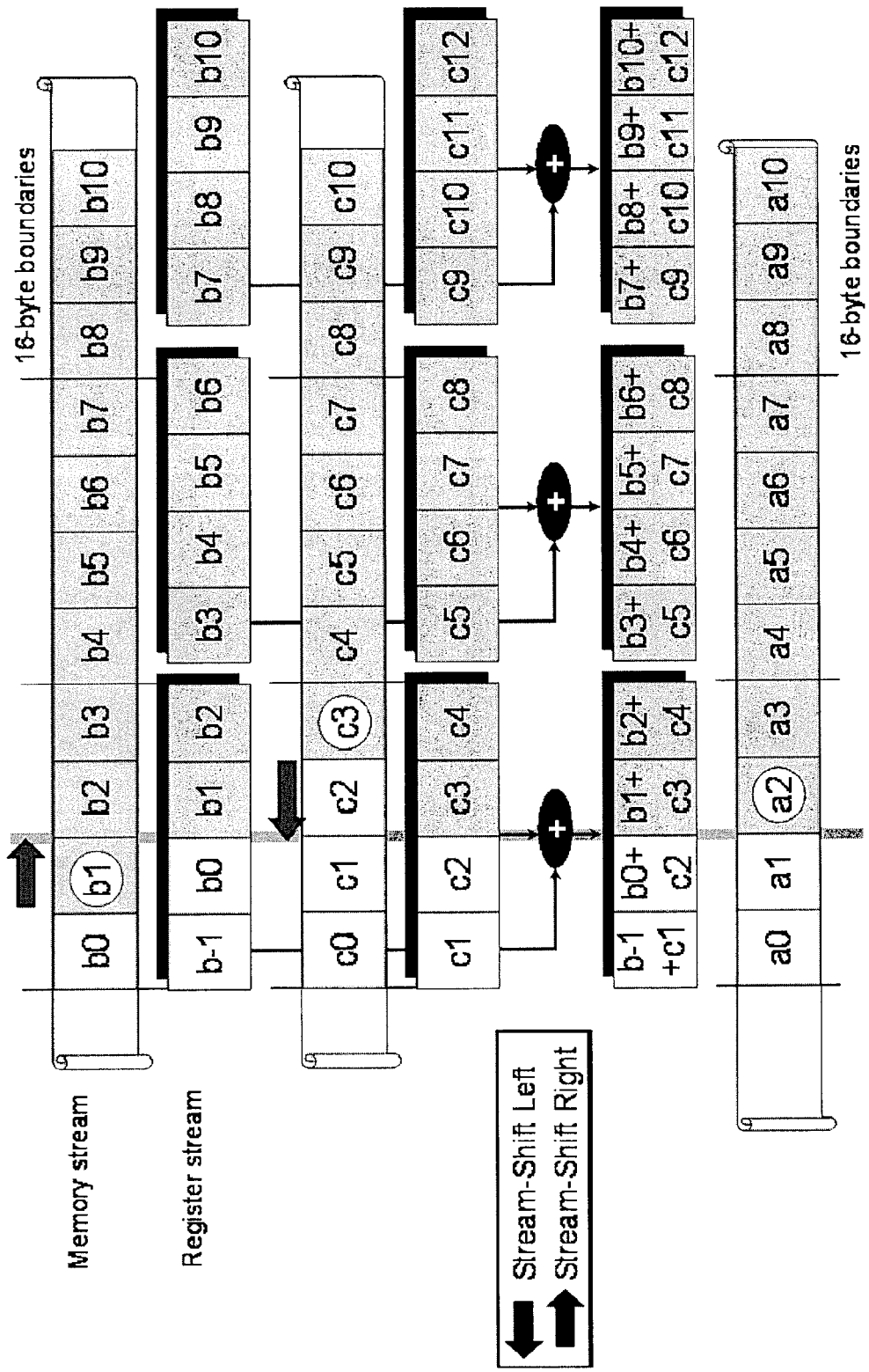
FIG. 3 depicts an aspect of simdizing in the presence of non-aligned data.

FIG. 3 also depicts the processing of multiple data via SIMD operations. However, due to the statement a[i+2]=b[i+1]+c[i+3], the data chunks to be processed are not aligned (e.g., not parallel) as they were in FIG. 2. Because the data chunks of "b" and "c" are not aligned with the target storage location of "a", the chunks should be shifted in order to produce the proper (e.g., desired) result. Accordingly, the chunks of "b" are loaded from their memory stream to a register stream, and then shifted in the register stream so that they align properly with the specified storage location. In this example, this is accomplished by shifting the chunks of "b" one location to the right. Software and hardware implementations of shifting data in this manner are well known in the art. Similarly, the chunks of "c" are loaded from their memory stream to a register stream, and then shifted in the register stream so that they align properly with the specified storage location. In this example, this is accomplished by shifting the chunks of "c" one location to the left. The data chunks are processed (e.g., added) and stored in the correct location of "a". This methodology is known as Shift-To-Store (STS) because the data are shifted to the storage location.

Figure 4:
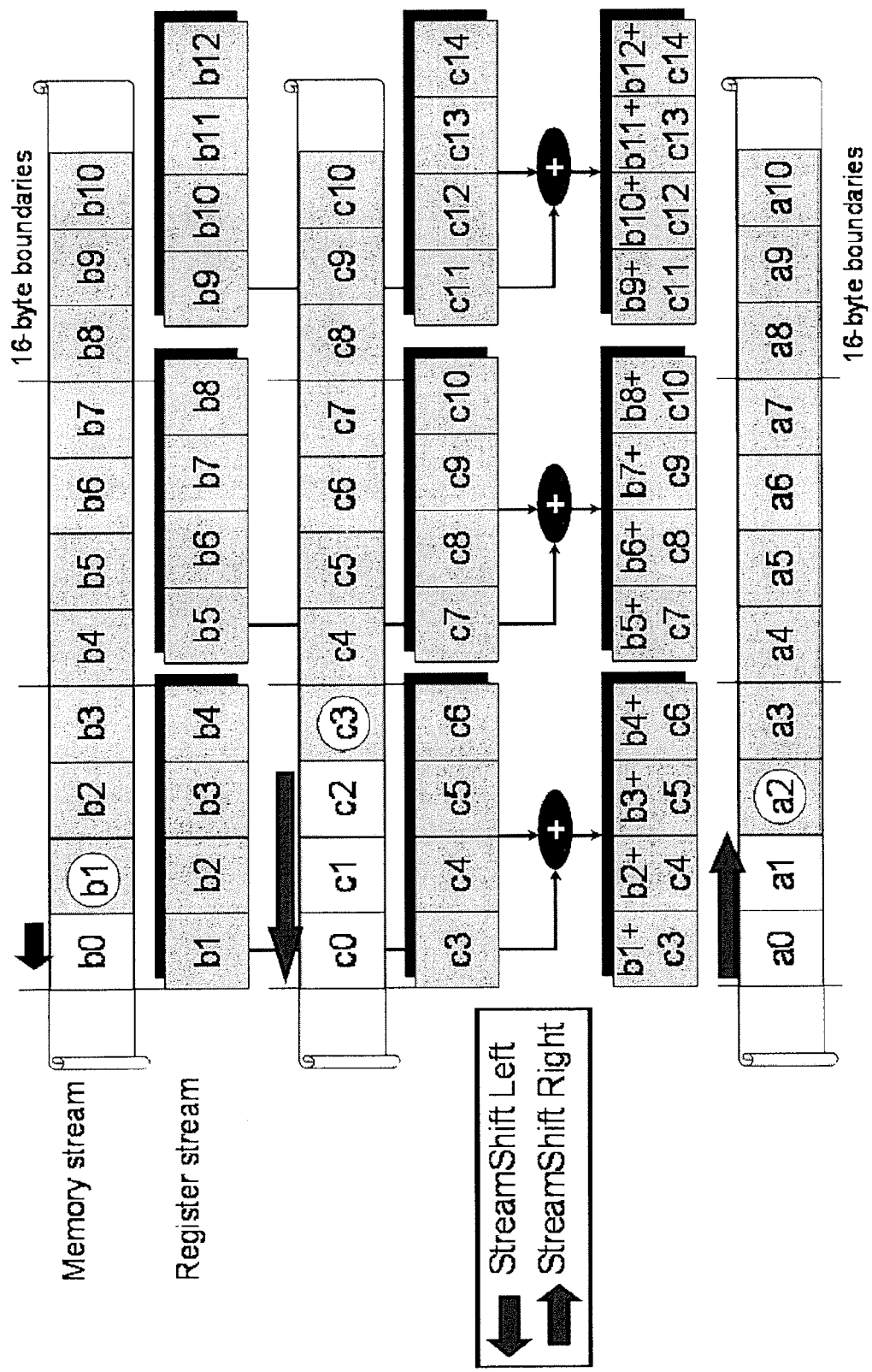
FIG. 4 depicts another aspect of simdizing in the presence of non-aligned data.

FIG. 4 depicts an alternative method of processing, via SIMD operations, the same data as that of FIG. 3. However, instead of shifting the data chunks to the storage location and then processing and storing, here the data chunks are shifted to a zero location and processed. The results are then shifted to the storage location and stored. This methodology is known as Shift-To-Zero (STZ).

Figures 5A, 5B:
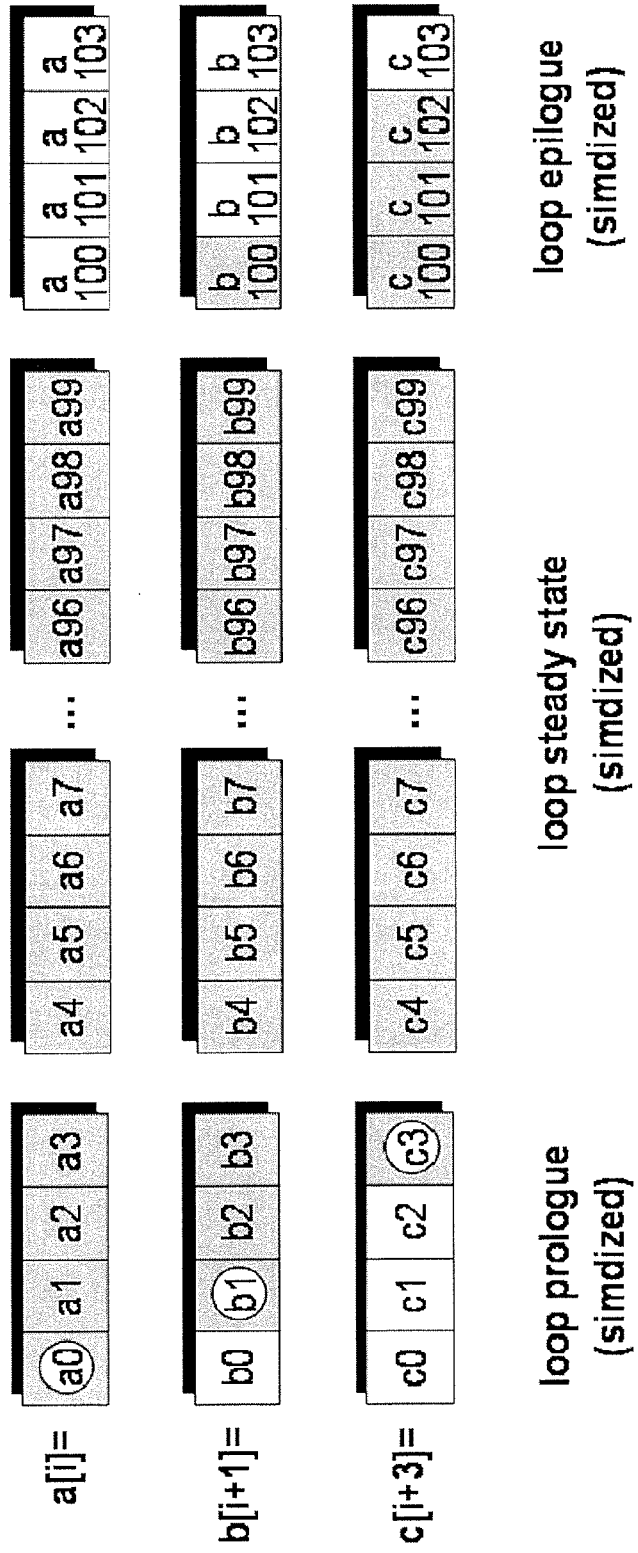
FIG. 5A shows an example of a loop to be simdized
FIG. 5B depicts aspects of SIMD operations of the loop.

FIG. 5A shows a loop with three statements, each having a different respective alignment with respect to the boundaries of the sixteen-byte chunks. FIG. 5B shows aspects of SIMD operation of the loop. Because SIMD operates using chunks of data, the prologue and epilogue of the loop (e.g., the data that are not in aligned chunks) are typically processed in a scalar (e.g., not SIMD) fashion. That is, the prologue corresponds to iterations done before entering the steady state simdized loop, and the epilogue corresponds to iterations performed after exiting the steady state simdized loop. This is known as "peeling" different numbers of original loop iterations for each statement, and changes the relative ordering in which each statement is executed. For example, in the original ordering, a[4], b[5], and c[7] would be executed in one iteration. However, due to peeling in the prologue, a[4], b[4], and c[4] are executed in the simdized iteration.

FIG. 6A shows an exemplary portion of source code including a loop with a single statement that does not contain any dependences and is not simdized (i.e., the arrays, c[ ] and d[ ], operate on single values during each iteration of the loop). FIGS. 6B and 6C depict internal representations of two code schemes for transforming the non-SIMD input code of FIG. 6A into SIMD code (e.g., where the arrays, c[ ] and d[ ], operate on multiple values during each iteration). The process of generating SIMD code for the input code comprises replacing the input code with one of the code schemes (also referred to as "transformations") shown. This is done, for example, as a high level process in the compiler, before the machine language code is generated, as will be understood by the skilled artisan. There are known techniques and systems for replacing input code with a transformation.

The first scheme, shown in FIG. 6B, is a Shift-To-Zero (STZ) scheme, where all of the input data is shifted left such that the first item of the loop is at slot zero in the register, and where the output data in the register is shifted before it is stored (similar to FIG. 4). The notation "A[e+0 . . . B−1]" is used to represent a B-element vector of "A[e], A[e+1], . . . , A[e+B−1]", where "e" is an arbitrary index expression. Statement 6 loads "B" values starting from d[i+Od] and aligning them such that the first value is in slot zero of the SIMD register. Similarly, the temporary variable currC in Statement 6 has the results of the computed "B" values for c[i+Oc+0 . . . B−1]. Statement 7 mixes the previous and current values of "c" such that the values stored are correct given the alignment of "c".

Still referring to FIG. 6B, Statement 4 preloads the current value of the array "c" (as modified, or not, in the prologue) which is shifted to zero so as to be in the same "state" (i.e. shifted to the same position) as the data that is otherwise computed in the steady state of the loop. While each of the SIMD computations in the right-hand-side (RHS) of the statement proceeds in lock step with respect to the original loop, the SIMD stores are skewed (i.e., not all the values computed in the current iteration are used).

The second scheme, shown in FIG. 6C, is a Shift-To-Store (STS) scheme, where the input streams are aligned directly to the alignment of the stored array (similar to FIG. 3). In the STS scheme, each of the computations are skewed in the SIMD loop with respect to the original loop because the SIMD loop computes precisely the values that are stored. The values that are stored depend on the alignment of each array stored into, which may be different for each of the statements involved. This skewing is evidenced by the "−Ac" that is found in the computations in Statement 5.

Figure 7:
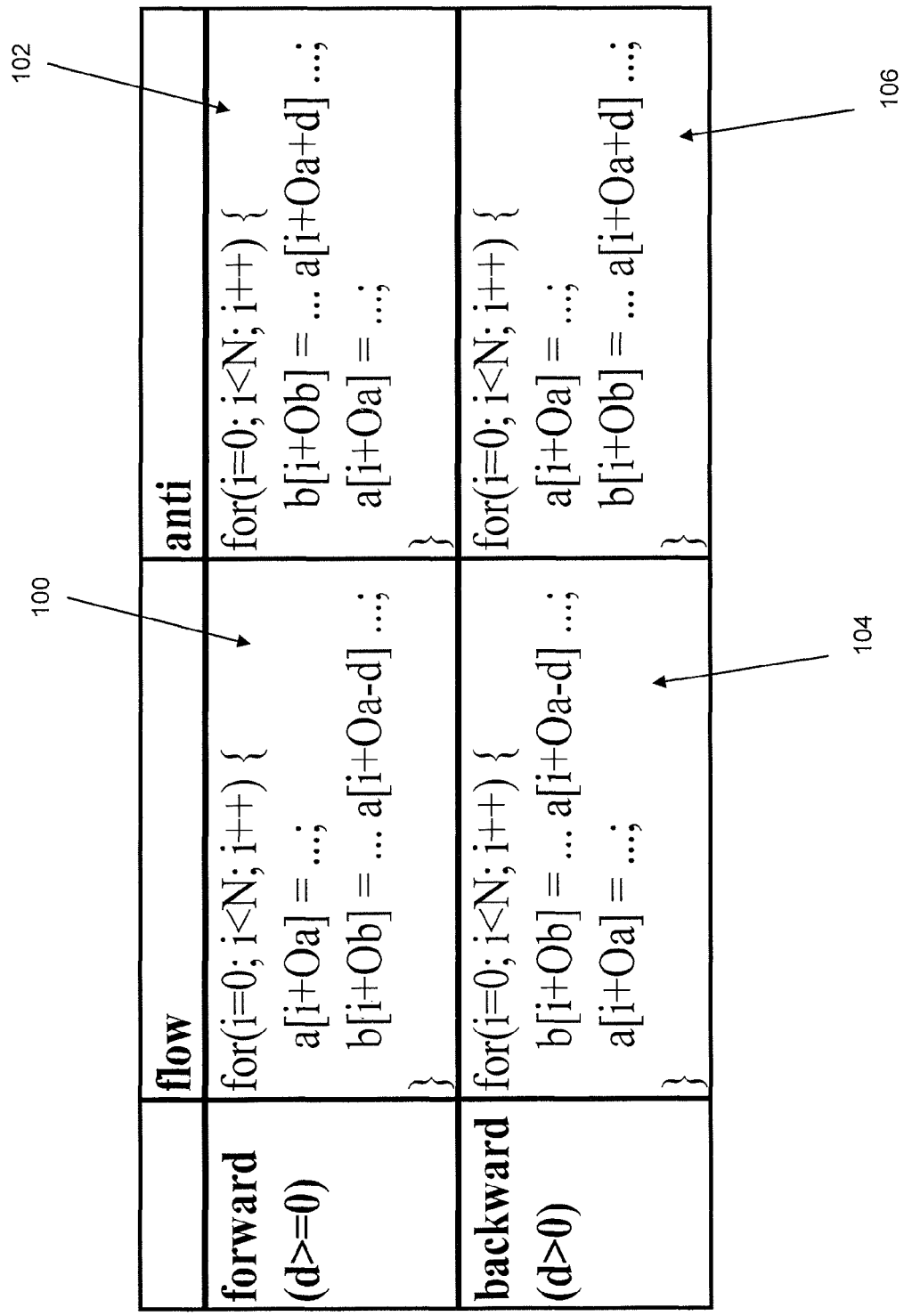
FIG. 7 shows examples of dependences.

FIG. 7 shows examples of loops with statements that have dependences. As described above, a dependence is a relationship between two statements where one statement uses a value that is defined in another statement. For example, as will be understood by those of skill in the art, a flow dependence is one in which the definition of an object occurs before its use, and an anti dependence is one in which the use happens before the definition. Also, a forward dependence is one in which the source statement appears before the sink statement in the code. Conversely, a backward dependence is one in which the sink statement appears before the source statement in the code. Accordingly, dependence 100 is a forward flow dependence, dependence 102 is a forward anti dependence, dependence 104 is a backward flow dependence, and dependence 106 is a backward anti dependence. The dependences 100, 102, 104, and 106 are merely exemplary, and the invention is contemplated for use with dependences of all types.

For example, the statements may use different references, there may be other non-related statements between the related statements, or there may be numerous dependences within a single loop, etc.

Still referring to FIG. 7, and as used throughout this disclosure, "a[ ]", "b[ ]", etc., refer to arrays of data, "Oa" refers to a constant offset for access of array "a", "Ob" refers to a constant offset for access of array "b", and "d" is the dependence distance (which must satisfy $d \geq 0$). Moreover, "Aa" is defined as the alignment of a[i+Oa] and "Ab" is the alignment of b[i+Ob]. For example, the value of "Aa" is represented by the statement "Aa=Align(a[i+Oa])". The alignment is the position of the memory address of a data element relative to the beginning of a chunk and is determinable using a modulo operation, as will be apparent to those of skill in the art. Assuming all of the data to be naturally aligned, "Aa" and "Ab" are defined in terms of elements (i.e., of array element data type). Lastly, "B" stands for the blocking factor, which is defined as the number of elements per SIMD vector.

Methods and compilers exist for generating SIMD code to effectuate the processes depicted in FIGS. 2-5B when there are no dependences in the source code. However, dependences between statements, such as those shown at 100, 102, 104 and 106, constrain the type of reordering (e.g., the processes of FIGS. 2-5B) that is legal to generate valid code. Accordingly, known methods and compilers are very conservative when simdizing code in the presence of dependences, and generally only simdize the code when the dependence has a large distance. This results in known methods and compilers not generating SIMD code for many loops since many dependences are, in actuality, very short. Implementations of the invention overcome these shortcomings by providing a system and method for generating SIMD code in the presence of dependences.

Figure 8:
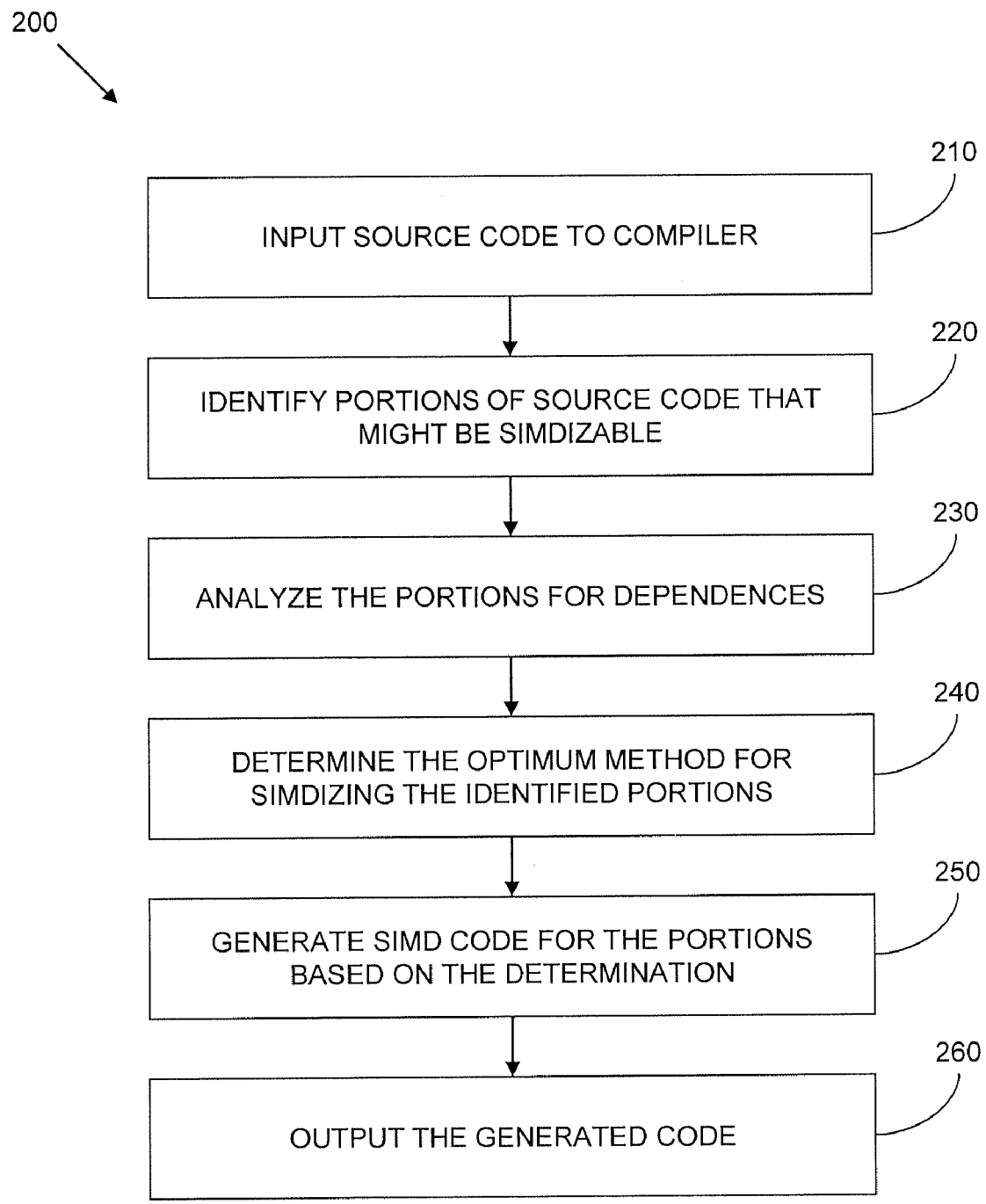
FIG. 8 shows a flow diagram of a method in accordance with aspects of the invention.

FIG. 8 is a flow diagram implementing a method of the invention. FIG. 8 may equally represent a high-level block diagram of the invention. The method of FIG. 8 (and all of the flow diagrams) may be implemented and executed from either a server, in a client-server relationship, or they may run on a user workstation with operative information conveyed to the user workstation to create the navigation outlined above. Additionally, the invention can take the form of an entirely hardware embodiment, an entirely software embodiment or an embodiment containing both hardware and software elements, or the invention can be executed at least partially manually. The steps of FIG. 8 (and all other flow diagrams) may also be representative of a high-level block diagram implementing the method.

FIG. 8 shows a flow diagram depicting a method 200 for generating optimized SIMD code in the presence of data dependences according to embodiments of the invention. In embodiments, the invention may be implemented as a method for generating code (e.g., compiling) and/or a system comprising a compiler that performs the method. In embodiments, the method comprises: receiving the source code as input; identifying, based upon predefined rules, which portions of source code to simdize (i.e., generate SIMD code for); analyzing the portions for dependences; determining the optimum method for simdizing the portions based upon the analysis; generating the SIMD code for the portions; and outputting the generated code.

For example, source code, such as a program written in C++, is input to a compiler with SIMD capability at step 210. This input may be accomplished in any known manner. At step 220, portions of the code that may be capable of simdizing are identified. This identification is sometimes referred to as "extracting parallelism" of the source code. The portions may be identified in any known manner, such as recognizing tags or patterns in the source code. Methods of performing such identification are known in the art.

Still referring to FIG. 8, the identified portions are analyzed for dependences and alignment at step 230. In embodiments, this includes determining if any dependences exists, the type of each dependence, the size (e.g., distance "d") of each dependence, and the alignment (e.g., "Aa" and "Ab") of data in the statements of each dependence with respect to fixed-length data chunks. Methods and software for performing dependence and alignment analysis are known in the art.

At step 240, the optimal method for generating SIMD code for each identified portion is determined. In embodiments, this is accomplished utilizing a compiler by applying a predefined logical analysis, as described below.

At step 250, SIMD code is generated for each respective portion based upon the determination in step 240. In embodiments, this comprises applying a transformation to the input code in a manner similar to that described with respect to FIGS. 6A-6C. That is, the respective portion of the non-SIMD input code is replaced with an appropriate segment of SIMD code that does not violate the dependence of the original portion of input code.

Still referring to FIG. 8, the generated SIMD code is output at step 260. This may include for example, outputting the generated SIMD code to downstream processes of the compiler, such as, for example, processes for generating machine language code from the internal representations.

Figure 9A:
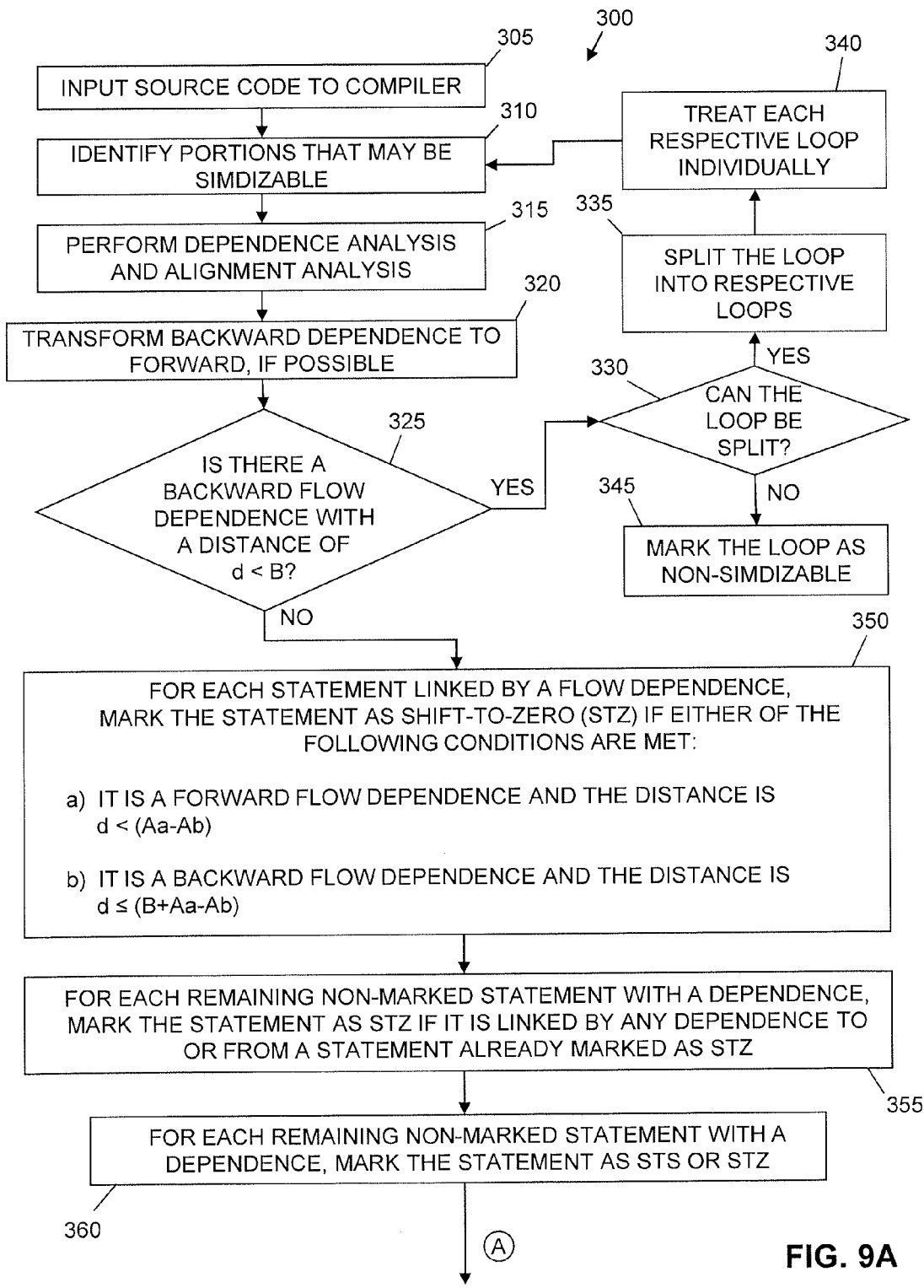
FIGS. 9A-9C show a flow diagram of a method in accordance with aspects of the invention.
Figure 9B:
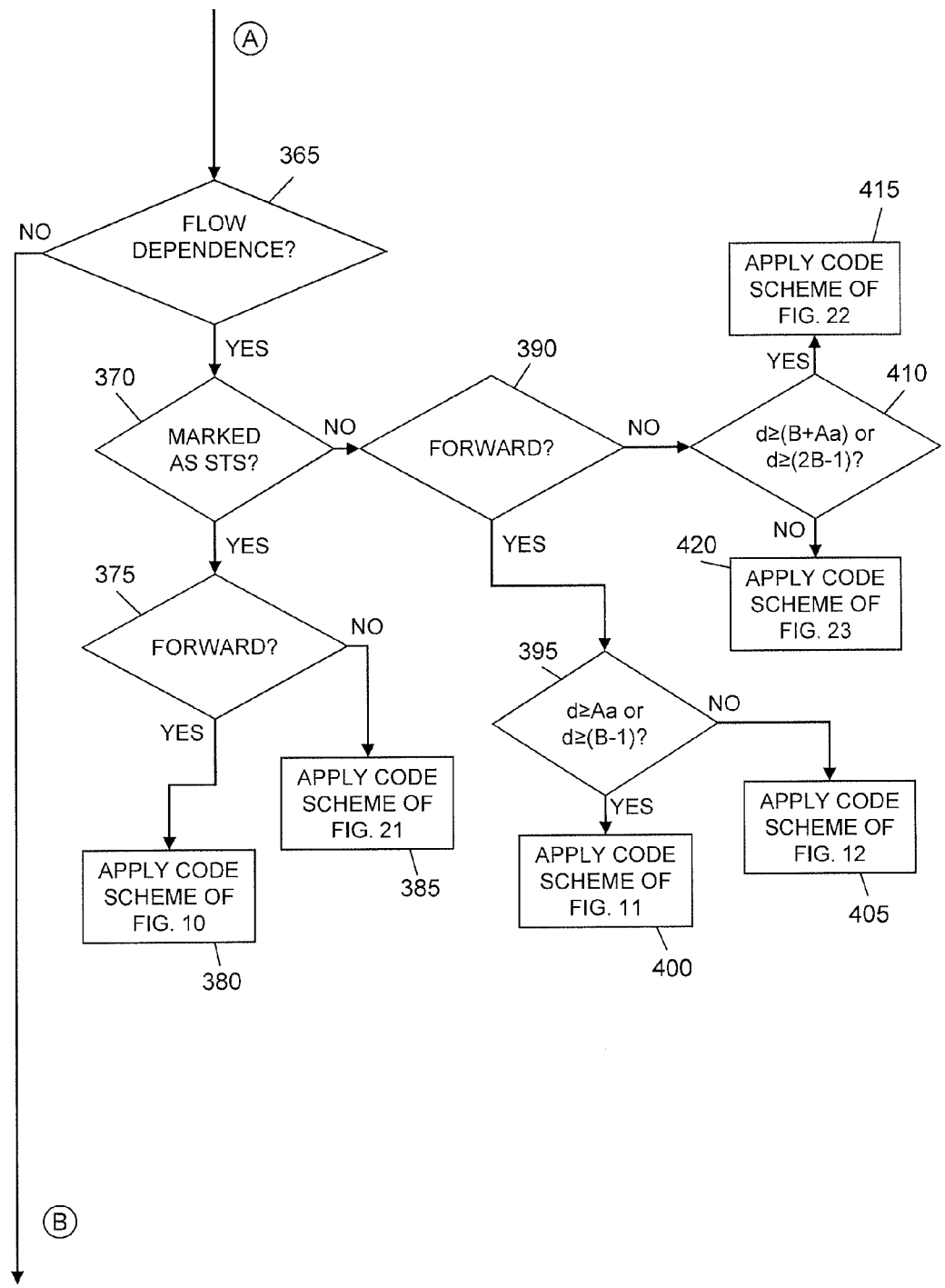
Figure 9C:
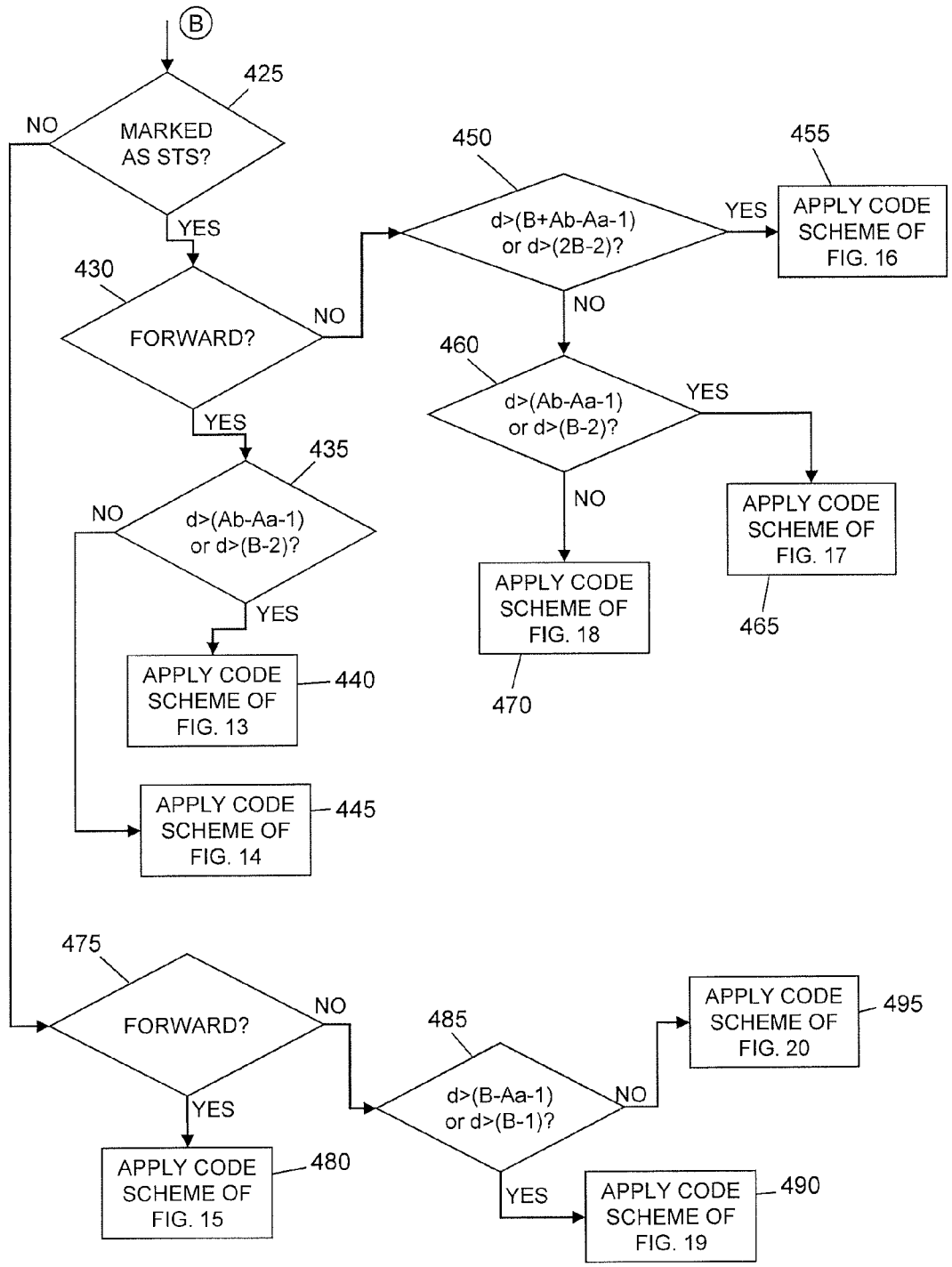

FIGS. 9A-9C show a flow diagram depicting a method 300 for generating optimized SIMD code in the presence of data dependences according to embodiments of the invention. Source code, such as, for example, a program written in C++, is input to a compiler with SIMD capability at step 305. This input may be accomplished in any known manner. At step 310, portions of the code that may be capable of simdizing are identified in any known manner.

At step 315, a dependence analysis and an alignment analysis are performed for the portions of code that were identified in step 310. In embodiments, this includes determining if any dependences exists and the type of each dependence (e.g., forward flow, forward anti, backward flow, or backward anti). This also includes determining, if it is possible to do so at compile time, the size (e.g., distance "d") of each dependence, and the alignment (e.g., "Aa" and "Ab") of data in the statements of each dependence with respect to fixed-length data chunks. The dependence analysis and an alignment analysis may be performed in any known manner.

Optionally, at step 320, for any backward dependence where it is possible to do so, the backward dependence is transformed to a forward dependence. Due to various design parameters (e.g., computing overhead) it is sometimes preferable to deal with forward dependences rather than backward dependences. Methods and techniques for transforming a backward dependence to a forward dependence are known in the art, and any may be used.

Any dependences that are backward flow dependence and satisfy the condition d<B are identified at step 325. In embodiments, this is accomplished by examining the data from the analyses of step 315 and any transformations from step 320. If there are not any such identified dependences, then the method proceeds to step 350. However, if there are any such dependences, then, at step 330, for any such identified dependence, a determination is made if the loop containing the dependence can be split. Splitting loops is known in the art and comprises applying a transformation that replaces the loop with two respective loops. The two respective loops each contain one of the statements of the dependence of the original loop, thereby eliminating the dependence of the original loop. Thus, if a loop containing a backwards flow dependence where d<B can legally be split, then it is split at step 335 and the respective loops are treated individually at step 340 (i.e., the respective loops are treated as originally input source code). However, if the loop cannot be split, then the loop is marked as not simdizable at step 345, and SIMD code is not generated for that portion of the source code.

The logical decision-making process for choosing which of many possible transformations to apply to each identified portion of input source code, based upon any known dependence data (e.g., "d", "B", "Aa", "Ab", etc.), generally begins at step 350. At step 350, any statement (whether it is a definition statement or a use statement) that is part of a forward flow dependence in which the distance satisfies d<(Aa−Ab) is marked as Shift-To-Zero (STZ). Likewise, any statement (whether it is a definition statement or a use statement) that is part of a backward flow dependence in which the distance satisfies d≦(B+Aa-Ab) is marked as STZ. In embodiments, the marking is accomplished by the compiler in any known manner, such as, for example, storing the data in a separate array.

For a given dependence, it is not always possible to determine at least one of "d", "Aa", and "Ab" at compile time (e.g., at step 315). Implementations of the invention compensate for such unknown values by assuming a worst case value for any missing data. Thus, if any of "d", "Aa", or "Ab" is not known for a particular dependence, then appropriate values must be substituted to make the determination at step 350. Any substitute value must be a legal value of "Aa" or "Ab" that would result in the most constraining value of "d" for the dependence. This will ensure a worst case scenario for the dependence (i.e., the smallest dependence distance possible), such that a relatively safe code generation scheme can be used for the particular dependence. In embodiments, the substitute values are generated by the compiler.

At step 355, any statement with a dependence to a statement identified and marked in step 350 (i.e., with a dependence to a statement already marked as STZ) is also marked as STZ. At step 360, each remaining statement of any identified dependence that was not marked in step 350 or step 355 may be marked as either STZ or Shift-To-Store (STS). The choice between marking the remaining statements as STZ or STS is guided by design considerations, such as, for example, computing overhead involved in simdizing using an STS scheme versus an STZ scheme. For example, due to design considerations, one may wish to mark all remaining loops as STS. Alternatively, if a significant number of statements are marked as STZ in steps 350 and 355, then the compiler may be programmed to mark all of the remaining statements as STZ for commonality. In embodiments, all of the remaining unmarked statements are marked as STS at step 360. Thus, every dependence identified in step 315 is marked as non-simdizable, STZ, or STS.

As shown in FIGS. 9B and 9C, each marked dependence is analyzed to determine an optimum SIMD code generation scheme. More particularly, referring to FIG. 9B, for each marked dependence, a determination is made as to whether it is a flow dependence at step 365. The determination is made using the data from step 315. If it is a flow dependence, then its marking as either STS or STZ is examined at step 370. If it is marked as STS, then an even further determination as to whether it is a forward or backward dependence is made at step 375. If it is a forward dependence (i.e., the dependence is a forward flow dependence marked as STS), then the transformation shown in FIG. 10 is applied at step 380. That is, SIMD code is generated for that portion of input code by replacing the appropriate portions of the loop of original source code with the code scheme shown in FIG. 10. This code scheme provides for SIMD operation of the original code without violating the assembly.

If, however, it is determined that the dependence is not a forward dependence at step 375 (i.e., the dependence is a backward flow dependence marked as STS), then the transformation shown in FIG. 21 is applied at step 385. That is, SIMD code is generated for that portion of input code by replacing the appropriate portions of the loop of original source code with the code scheme shown in FIG. 21.

At step 370, if it is determined that the dependence is not marked as STS (i.e., it is marked as STZ), then a further determination is made at step 390 whether the dependence is forward. If it is forward, then an even further determination is made at step 395 whether the distance "d" satisfies either $d \geq Aa$ or $d \geq (B-1)$. The latter condition, $d \geq (B-1)$, may be used if "Aa" is not known at compile time. If the dependence satisfies either condition at step 395 (i.e., the dependence is flow forward, marked as STZ, and either $d \leq Aa$ or $d \geq (B-1)$), then the transformation shown in FIG. 11 is applied at step 400. That is, SIMD code is generated for that portion of input code by replacing the appropriate portions of the loop of original source code with the code scheme shown in FIG. 11.

If, however, the dependence does not satisfy either condition at step 395 (i.e., the dependence is flow forward, marked as STZ, and neither $d \geq Aa$ nor $d \geq (B-1)$), then the transformation shown in FIG. 12 is applied at step 405. That is, SIMD code is generated for that portion of input code by replacing the appropriate portions of the loop of original source code with the code scheme shown in FIG. 12. This code scheme produces valid results for $d \leq B$. As will be apparent from the code scheme shown in FIG. 12, the use statement is shifted from temporary values as opposed to the memory location.

If, at step 390, it is determined that the dependence is not forward (i.e., it is a backward dependence), then a further determination is made at step 410 whether the distance " " satisfies either $d \geq (B+Aa)$ or $d \geq (2B-1)$. If the dependence satisfies either condition at 410 (i.e., the dependence is flow backward, marked as STZ, and either $d \geq (B+Aa)$ or $d \geq (2B-1)$), then the transformation shown in FIG. 22 is applied at step 415. That is, SIMD code is generated for that portion of input code by replacing the appropriate portions of the loop of original source code with the code scheme shown in FIG. 22.

If, however, the dependence does not satisfy either condition at step 410 (i.e., the dependence is flow backward, marked as STZ, and neither $d \geq (B+Aa)$ or $d \geq (2B-1)$), then the transformation shown in FIG. 23 is applied at step 420. That is, SIMD code is generated for that portion of input code by replacing the appropriate portions of the loop of original source code with the code scheme shown in FIG. 23. As will be apparent from the code scheme shown in FIG. 23, the use statement is shifted from the temporary values as opposed to the memory location. It is noted that a backward flow dependence where $d<B$ would not reach this point of the analysis because it would be marked as not simdizable at step 350.

Returning to step 365, if a particular dependence is not a flow dependence (i.e., it is an anti dependence), then the logic depicted in FIG. 9C is applied. First, a determination is made at step 425 as to whether the dependence in question is marked as STS. If so, then a further determination is made at step 430 whether the dependence is a forward dependence. If so, then an even further determination is made at step 435 whether the dependence satisfies either of $d \geq (Ab-Aa-1)$ or $d \geq (B-2)$. If the dependence does satisfy either condition at step 435 (i.e., the dependence is forward anti, marked as STS, and either $d>(Ab-Aa-1)$ or $d>(B-2)$), then the transformation shown in FIG. 13 is applied at step 440. That is, SIMD code is generated for that portion of input code by replacing the appropriate portions of the loop of original source code with the code scheme shown in FIG. 13.

Alternatively, if the dependence does not satisfy either condition at step 435 (i.e., the dependence is forward anti, marked as STS, and neither $d>(Ab-Aa-1)$ nor $d>(B-2)$), then the transformation shown in FIG. 14 is applied at step 445. That is, SIMD code is generated for that portion of input code by replacing the appropriate portions of the loop of original source code with the code scheme shown in FIG. 14. As will be apparent from FIG. 14, a software-pipeline strategy is employed (e.g., the use reference is software pipelined) in the SIMD code scheme.

If, at step 430, it is determined that the dependence is not forward (i.e., it is a backward dependence), then a further determination is made at step 450 whether the distance "d" satisfies either $d \geq (B+Ab-Aa-1)$ or $d>(2B-2)$. If the dependence satisfies either condition at step 450 (i.e., the dependence is anti backward, marked as STS, and either $d \geq (B+Ab-Aa-1)$ or $d>(2B-2)$), then the transformation shown in FIG. 16 is applied at step 455. That is, SIMD code is generated for that portion of input code by replacing the appropriate portions of the loop of original source code with the code scheme shown in FIG. 16.

However, if neither condition is satisfied at step 450, then a further determination is made whether $d>(Ab-Aa-1)$ or $d>(B-2)$ at step 460. If this condition is met (i.e., the dependence is anti backward, marked as STS, and $d>(Ab-Aa-1)$ or $d>(B-2)$ but neither $d \geq (B+Ab-Aa-1)$ nor $d>(2B-2)$), then the transformation shown in FIG. 17 is applied at step 465. That is, SIMD code is generated for that portion of input code by replacing the appropriate portions of the loop of original source code with the code scheme shown in FIG. 17. As will be apparent from FIG. 17, the use values are read before the definition of "a" in the same SIMD iteration.

If, however, the dependence does not satisfy the condition at step 460 (i.e., the dependence is anti backward, marked as STS, and neither $d>(Ab-Aa-1)$ nor $d>(B-2)$), then the transformation shown in FIG. 18 is applied at step 470. That is, SIMD code is generated for that portion of input code by replacing the appropriate portions of the loop of original source code with the code scheme shown in FIG. 18. As will be apparent from FIG. 18, a software-pipeline strategy is employed (e.g., the use reference is software pipelined) in the SIMD code scheme.

Returning to step 425, if the dependence has been marked as STZ, then a further determination is made at step 475 whether the dependence is forward. If the dependence is forward (i.e., the dependence is anti forward, marked as STZ, and for any value of "d"), then the transformation shown in FIG. 15 is applied at step 480. That is, SIMD code is generated for that portion of input code by replacing the appropriate portions of the loop of original source code with the code scheme shown in FIG. 15. Using this code scheme, the forward anti dependence marked as STZ is always satisfied regardless of the dependence distance.

If, at step 475, it is determined that the dependence is not forward (i.e., it is a backward dependence), then a further determination is made at step 485 whether the distance "d" satisfies $d>(B-Aa-1)$ or $d>(B-1)$. If the dependence distance satisfies this condition at step 485 (i.e., the dependence is anti backward, marked as STZ, and $d>(B-Aa-1)$ or $d>(B-1)$), then the transformation shown in FIG. 19 is applied at step 490. That is, SIMD code is generated for that portion of input code by replacing the appropriate portions of the loop of original source code with the code scheme shown in FIG. 19.

Alternatively, if the condition at step 485 is not satisfied (i.e., the dependence is anti backward, marked as STZ, and neither d>(B−Aa−1) nor d>(B−1)), then the transformation shown in FIG. 20 is applied at step 495. That is, SIMD code is generated for that portion of input code by replacing the appropriate portions of the loop of original source code with the code scheme shown in FIG. 20. As will be apparent from FIG. 20, SIMD code scheme reads and uses the values of "a" before they are redefined. This particular code scheme is always valid for a backward anti dependence marked as STZ.

Alternatively to the analysis described with respect to steps 425-495, SIMD code can be safely generated for every anti dependence by software-pipelining the use reference. The utilization of software pipelining for all anti dependences may increase overhead, but may simplify the handling of the anti dependences. Therefore, the decision to employ the strategy of steps 425-495 or to software pipeline all of the anti dependences should be made based upon design parameters.

Each dependence identified in step 315 is individually analyzed in the manner described above. The application of the various code schemes is summarized in FIG. 24A for STS and FIG. 24B for STZ. In this manner, valid SIMD code that does not violate the dependence is generated for each simdizable statement, even when relatively short dependence distances (e.g., d<Aa, d<B, etc.) are encountered (except where there is a backward flow dependence where d<B). The generated code may be output in any known manner.

Moreover, in embodiments, SIMD code is generated is any known manner for any simdizable code portions identified at step 310 that do not contain any dependences (as determined at step 315). Thus, implementations of the invention provide for the generation of optimized SIMD code is for every identified simdizable portion of source code regardless of dependence distance, except where there is a backward flow dependence where d<B.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The processes described herein can be implemented in the infrastructure shown in FIG. 1.

In another embodiment, the invention provides a business method that performs the process steps of the invention on a subscription, advertising, and/or fee basis. That is, a service provider, such as a Solution Integrator, could offer to generate optimized code. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While the invention has been described in terms of embodiments, those skilled in the art will recognize that the invention can be practiced with modifications and in the spirit and scope of the appended claims.

What is claimed:

1. A method of generating code, comprising:
   identifying at least one portion of source code that is simdizable and has a dependence;
   analyzing, using a computing device, the dependence for characteristics;
   based upon the characteristics, selecting a transformation from a predefined group of possible transformations; and
   applying the transformation to the at least one portion to generate SIMD code for the at least one portion.

2. The method of claim 1, further comprising inputting the source code to a compiler and outputting the generated SIMD code from the compiler.

3. The method of claim 1, wherein the characteristics comprise a dependence distance.

4. The method of claim 3, wherein the characteristics further comprise an alignment value.

5. The method of claim 4, wherein the characteristics further comprise a dependence type selected from a group comprising: forward flow dependence, backward flow dependence, forward anti dependence, and backward anti dependence.

6. The method of claim 4, wherein:
   the selecting comprises selecting a first transformation when the dependence distance and the alignment value are determinable via the analyzing, and selecting a second transformation when at least one of the dependence distance and alignment value are not determinable via the analyzing.

7. The method of claim 1, wherein the characteristics comprise an alignment value.

8. The method of claim 1, wherein the characteristics comprise a dependence type selected from a group comprising: forward flow dependence, backward flow dependence, forward anti dependence, and backward anti dependence.

9. A method for generating SIMD code, comprising:
   identifying at least one dependence in a source code;
   analyzing, using a computing device, the at least one dependence for a distance and an alignment; and
   applying a first SIMD code generation scheme when the distance and alignment are determinable via the analyzing, and applying a second SIMD code generation scheme when at least one of the distance and the alignment is not determinable via the analyzing.

10. The method of claim 9, wherein before the applying, the method further comprises:
    characterizing the at least one dependence as one of: forward flow, backward flow, forward anti, and backward anti; and
    selecting the first SIMD code generation scheme or the second SIMD code generation scheme based upon the characterizing.

11. The method of claim 9, wherein:
    a group of possible SIMD code generation schemes comprises the first SIMD code generation scheme and the second SIMD code generation scheme; and
    the at least one dependence comprises a plurality of dependences;

further comprising for each respective dependence of the plurality of dependences:
identifying and analyzing the respective dependence; and
applying one SIMD code generation scheme from the group of possible SIMD code generation schemes when the distance and the alignment of the respective dependence are determinable via the analyzing, and applying an other SIMD code generation scheme from the group of possible SIMD code generation schemes when at least one of the distance and the alignment is not determinable via the analyzing.

12. A computer program product comprising a computer useable tangible medium including a computer readable program, wherein the computer readable program when executed on a computer causes the computer to:
identify at least one portion of source code that is simdizable and has a dependence; analyze the dependence for characteristics;
based upon the characteristics, select a transformation from a predefined group of possible transformations; and
apply the transformation to the at least one portion to generate SIMD code for the at least one portion.

13. The computer program product of claim 12, wherein the computer readable program when executed on a computer further causes the computer to input the source code to a compiler and output the generated SIMD code from the compiler.

14. The computer program product of claim 12, wherein the characteristics comprise a dependence distance.

15. The computer program product of claim 14, wherein the characteristics further comprise an alignment value.

16. The computer program product of claim 15, wherein the characteristics further comprise a dependence type selected from a group comprising: forward flow dependence, backward flow dependence, forward anti dependence, and backward anti dependence.

17. The computer program product of claim 15, wherein:
the selecting comprises selecting a first transformation when the dependence distance and the alignment value are determinable via the analyzing, and selecting a second transformation when at least one of the dependence distance and alignment value are not determinable via the analyzing.

18. The computer program product of claim 12, wherein the characteristics further comprise an alignment value.

19. The computer program product of claim 12, wherein the characteristics further comprise a dependence type selected from a group comprising: forward flow dependence, backward flow dependence, forward anti dependence, and backward anti dependence.

20. A system, comprising:
a computer infrastructure comprising:
a compiler including:
an identifier to identify at least one portion of source code that is simdizable and has a dependence;
an analyzer to analyze the dependence for characteristics;
a selector to select a transformation from a predefined group of possible transformations based upon the characteristics; and
an applier to apply the transformation to the at least one portion to generate SIMD code for the at least one portion.

21. The system of claim 20, wherein the compiler receives the source code as input and outputs the generated SIMD code.

22. The system of claim 20, wherein the characteristics comprise a dependence distance.

23. The system of claim 22, wherein the characteristics further comprise an alignment value.

24. The system of claim 23, wherein the characteristics further comprise a dependence type selected from a group comprising: forward flow dependence, backward flow dependence, forward anti dependence, and backward anti dependence.

25. The system of claim 23, wherein:
the selector selects a first transformation when the dependence distance and the alignment value are determinable by the analyzer, and a second transformation when at least one of the dependence distance and alignment value are not determinable by the analyzer.

26. The system of claim 20, wherein the characteristics further comprise an alignment value.

27. The system of claim 20, wherein the characteristics further comprise a dependence type selected from a group comprising: forward flow dependence, backward flow dependence, forward anti dependence, and backward anti dependence.

28. A method for deploying an application for generating SIMD code, comprising providing a computer infrastructure being operable to:
identify at least one portion of source code that is simdizable and has a dependence;
analyze, using the computing infrastructure, the dependence for characteristics;
based upon the characteristics, select a transformation from a predefined group of possible transformations; and
apply the transformation to the at least one portion to generate SIMD code for the at least one portion.

29. The method of claim 28, wherein the computer infrastructure is further operable to input the source code to a compiler and output the generated SIMD code from the compiler.

30. The method of claim 28, wherein the characteristics comprise a dependence distance.

31. The method of claim 30, wherein the characteristics further comprise an alignment value.

32. The method of claim 31, wherein the characteristics further comprise a dependence type selected from a group comprising: forward flow dependence, backward flow dependence, forward anti dependence, and backward anti dependence.

33. The method of claim 31, wherein:
the selecting comprises selecting a first transformation when the dependence distance and the alignment value are determinable via the analyzing, and selecting a second transformation when at least one of the dependence distance and alignment value are not determinable via the analyzing.

34. The method of claim 28, wherein the characteristics comprise an alignment value.

35. The method of claim 28, wherein the characteristics further comprise a dependence type selected from a group comprising: forward flow dependence, backward flow dependence, forward anti dependence, and backward anti dependence.

* * * * *